United States Patent
Kita

[11] Patent Number: 6,025,290
[45] Date of Patent: *Feb. 15, 2000

[54] CERAMICS HAVING A LOW HEAT CONDUCTIVITY

[75] Inventor: Hideki Kita, Fujisawa, Japan

[73] Assignee: Isuzu Ceramics Research Institute Co., Ltd., Fujisawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/877,802

[22] Filed: Jun. 18, 1997

[30] Foreign Application Priority Data

Jun. 19, 1996 [JP] Japan ................................. 8-178428

[51] Int. Cl.$^7$ ................................. C04B 35/596
[52] U.S. Cl. .................. 501/97.4; 501/97.2; 501/97.3; 501/119; 501/122; 501/128; 428/428
[58] Field of Search ................. 501/97.2, 97.3, 501/97.4, 128, 119, 122; 428/428

[56] References Cited

U.S. PATENT DOCUMENTS

| | | | |
|---|---|---|---|
| 4,304,576 | 12/1981 | Hattori et al. | 501/97.4 |
| 4,542,109 | 9/1985 | Pasto | 501/97.4 |
| 5,023,215 | 6/1991 | Cleveland | 501/98 |
| 5,120,328 | 6/1992 | Pyzik | 501/97.4 |
| 5,234,643 | 8/1993 | Matsumoto | 501/97.4 |
| 5,635,431 | 6/1997 | Ikeda et al. | 501/97.3 |
| 5,637,540 | 6/1997 | Li et al. | 501/97.3 |

FOREIGN PATENT DOCUMENTS

| | | | |
|---|---|---|---|
| 354015916 | 2/1979 | Japan | 501/97.2 |
| 354034311 | 3/1979 | Japan | 501/97.2 |
| 403164473 | 7/1991 | Japan . | |

*Primary Examiner*—Karl Group
*Attorney, Agent, or Firm*—Staas & Halsey LLP

[57] ABSTRACT

In the ceramics having a low heat conductivity, silicon nitride is contained as a main component, a composite oxide or a separate phase thereof and transition metal elements having 66 to 75 of atomic number are dispersed into a substrate, and a minute layer grown continuous to the substrate is formed on the surface of the substrate. The composite oxide is at least one of $3Al_2O_3 \cdot 2SiO_2$, $2MgO \cdot 2Al_2O_3 \cdot 5SiO_2$, $2MgO \cdot SiO_2$ and $4MgO \cdot 5Al_2O_3 \cdot 2SiO_2$. The adding quantity of the composite oxide and the separate phase thereof is 15 to 60 wt. % in terms of the composite oxide. The adding component of transition metal elements having 66 to 75 of atomic number is less 10 wt. % in terms of oxide of the transition metal elements.

7 Claims, 3 Drawing Sheets ceramics containing 1.0 wt% of $Ta_2O_5$
temperature of exposure: 1100 ℃
period of exposure: 187 hrs
magnification: 4000 times ceramics containing 1.0 wt% of $Fe_3O_4$
temperature of exposure: 1100 °C
period of exposure: 187 hrs
magnification: 4000 times

CERAMICS HAVING A LOW HEAT CONDUCTIVITY

BACKGROUND OF THE INVENTION

The present invention relates to a silicon nitride sintered body utilized for a member subjected to heat load, for example, such as a piston, a port liner, a manifold and the like, and more specifically, to ceramics containing silicon nitride as a main component and having a low heat conductivity.

A process for compounding a fine quantity of various additives has been employed in order to improve an oxidation resistance of reacted-sintered silicon nitride, for example, as disclosed in Japanese Patent Application Laid-open No. 58-140375 Publication. However, ceramics obtained by the known process is merely reduced in a degree of the lowering of strength after being exposed to high temperature air, and is not improved in strength.

In view of the aforementioned problem, an object of the present invention is to provide ceramics having a low heat conductivity in which a minute layer formed on the surface of a substrate due to the exposure of high temperature air prevents oxygen from being diffused into the substrate, thus exhibiting the oxidation resistance and enhancing the strength of the substrate.

SUMARY OF THE INVENTION

For solving the aforementioned problem, the constitution of the present invention is characterized in that silicon nitride is contained as a main component, a composite oxide or a separate phase thereof and transition metal elements having 66 to 75 of atomic number are dispersed in the main component.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
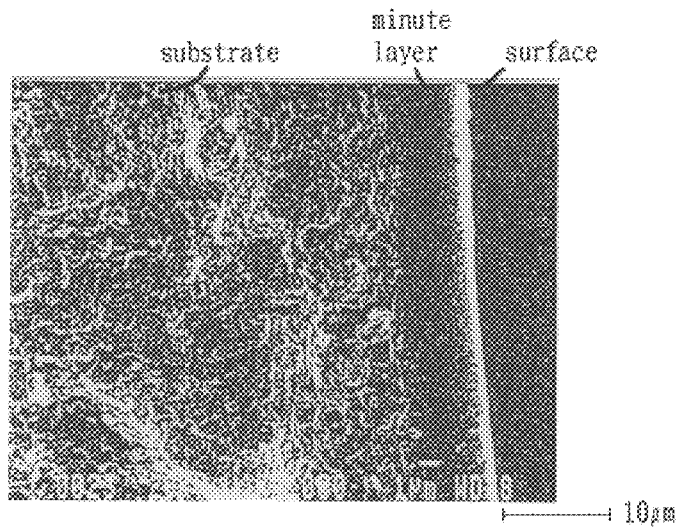
FIG. 1 is an enlarged sectional view showing ceramics having a low heat conductivity according to the present invention.

In the ceramics having a low heat conductivity according to the present invention, silicon nitride is contained as a main component, a composite oxide or a separate phase thereof as a first adding component and transition metal elements having 66 to 75 of atomic number such as Ta (tantalum) as a second adding component are dispersed into a ceramics substrate (hereinafter merely referred to as a substrate), and a minute layer grown continuous to the substrate is formed on the surface of the substrate. The composite oxide as the first adding component is at least one of $3Al_2O.2SiO_2$, $2MgO.2Al_2O_3.5SiO_2$, $2MgO.SiO_2$ and $4MgO.5Al_2O_3.2SiO_2$. The adding quantity of the composite oxide and the separate phase thereof is 15 to 60 wt. % in terms of the composite oxide.

The second adding component is at least one of oxides of transition metal elements having 66 to 75 of atomic number, specifically, $Ta_2O_5$, $WO_3$, $HfO_2$, $Dy_2O_3$ and $Yb_2O_3$. The adding quantity of the transition metal elements having 66 to 75 of atomic number is less than 10 wt. %, more preferably, 0.5 to 10 wt. % in terms of oxide thereof.

A composite oxide containing silica and an oxide of transition metal elements having 66 to 75 of atomic number such as $Ta_2O_5$ are added to thereby reduce a heat conductivity of a substrate, and a layer is naturally formed on the surface of the substrate after exposure of high temperature air. The layer on the surface of the substrate prevents oxygen from entering into the substrate to minimize a defective dimension of the surface of the substrate and improve the strength of the substrate.

A part of the composite oxide is vitreous under high temperature, which stays within pores and overflows on the surface of the substrate due to the capillary action to form a minute vitreous layer. When Ta is added to ceramics, it is possible to suppress movement of elements constituting the aforementioned minute vitreous layer. That is, it is possible considerably suppress that the elements constituting the layer is bonded with oxygen outside the substrate, and the elements constituting the layer is diffused into the substrate to deteriorate the tissue of the substrate. Further, since the vitreous layer formed on the surface of the substrate closes the pores in the surface of the substrate, the strength of the substrate is enhanced more than that before exposure of high temperature air.

EXAMPLE

The ceramics according to the present invention is obtained by molding a molded body having a desired shape from raw material prepared by adding 1 weight part (about 1 wt. % of total amount) of $Ta_2O_5$ to a mixed powder comprising 50 weight parts of Si, 30 weight parts of $Al_6Si_2O_{13}$ and 20 weight parts of $Si_3N_4$, and sintering said molded body by a known process. The ceramics of the present invention, obtained as described above, was exposed for 187 hours to high temperature air (atmosphere) at a temperature of 1100° C.

As a Comparative example, ceramics was sintered by a known process from raw material prepared by adding 1 weight part (about 1 wt. % of total amount) of $Fe_3O_4$ generally known as a nitriding accelerator in place of $Ta_2O_5$ to the aforementioned mixture. The exposure test of high temperature air was carried out to the Comparative example.

Figure 2:
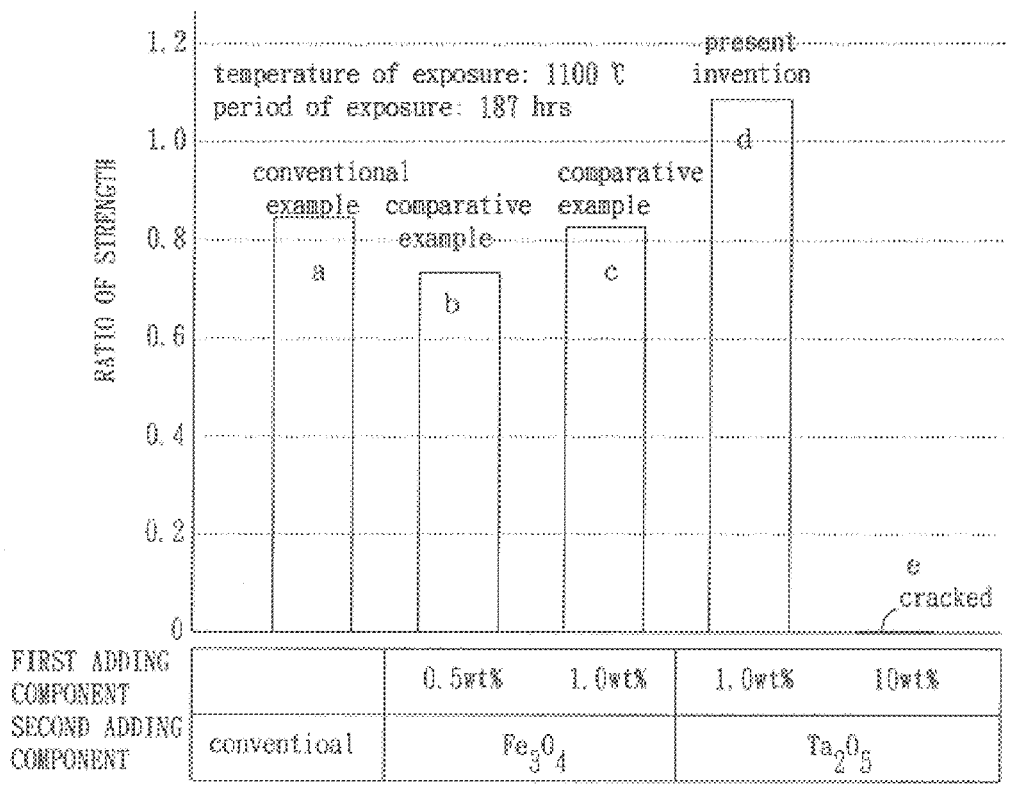
FIG. 2 is a diagram showing a relationship between additives of ceramics according to the present invention and Comparative Example and changes of strengths before and after exposure of high temperature air.
Figure 5:
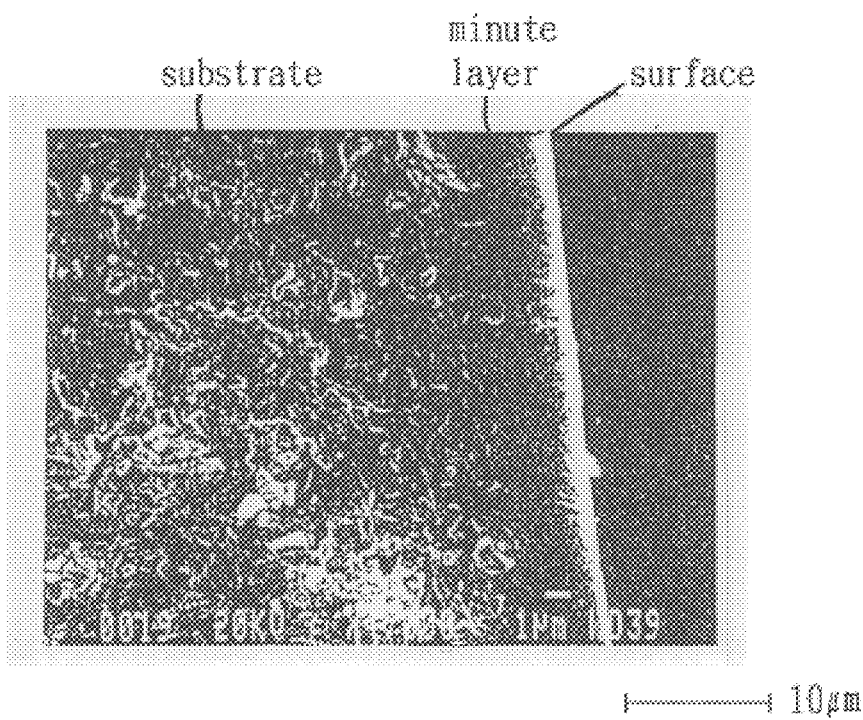
FIG. 5 is an enlarged sectional view showing ceramics according to the Comparative Example.

FIGS. 1 and 5 show a section (magnification: 4000 times) of ceramics according to the present invention after exposure test of high temperature air, and a section of ceramics according to the Comparative example after exposure test of high temperature air, respectively. It is understood that both the ceramics are formed on the surface of the substrate with a minute vitreous layer having about 3 μm of thickness. FIG. 2 shows the ratio of strength (strength after exposure of high temperature air/strength before exposure of high temperature air) obtained from the measured results of the strength before exposure of high temperature air and the strength after exposure of high temperature air. In the ceramics to which $Ta_2O_5$ is added according to the present invention, the strength after exposure of high temperature air was improved, whereas in the ceramics to which $Fe_3O_4$ is added according to the Comparative example and the conventional ceramics to which none is added, the strength after exposure of high temperature air was lowered.

Next, with respect to the ceramics d to which $Ta_2O_5$ is added according to the present invention and the ceramics b and c to which $Fe_3O_4$ is added according to the Comparative example, the strengths of ones in which the surface of the substrate was polished to remove a layer were measured. As a result, it was found that the strength of the ceramics d according to the present invention was substantially the same as that of the substrate from which the layer is not removed, whereas in the ceramics b and c according to the Comparative example, the strength was apparently lowered.

Figure 3:
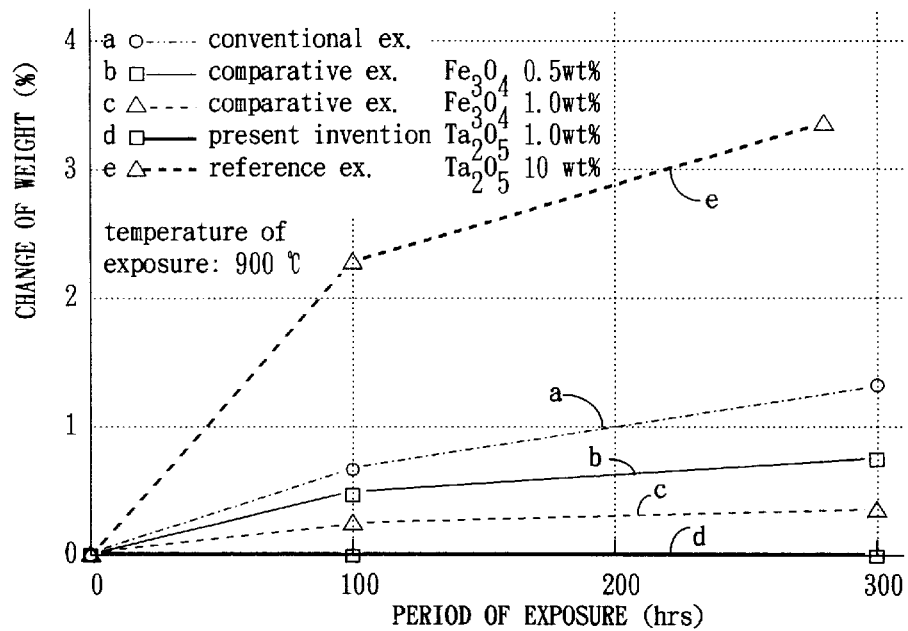
FIG. 3 is a diagram showing a relationship between the exposure time of high temperature air and the increase rate of weight with respect to ceramics according to the present invention and the Comparative Example.
Figure 4:
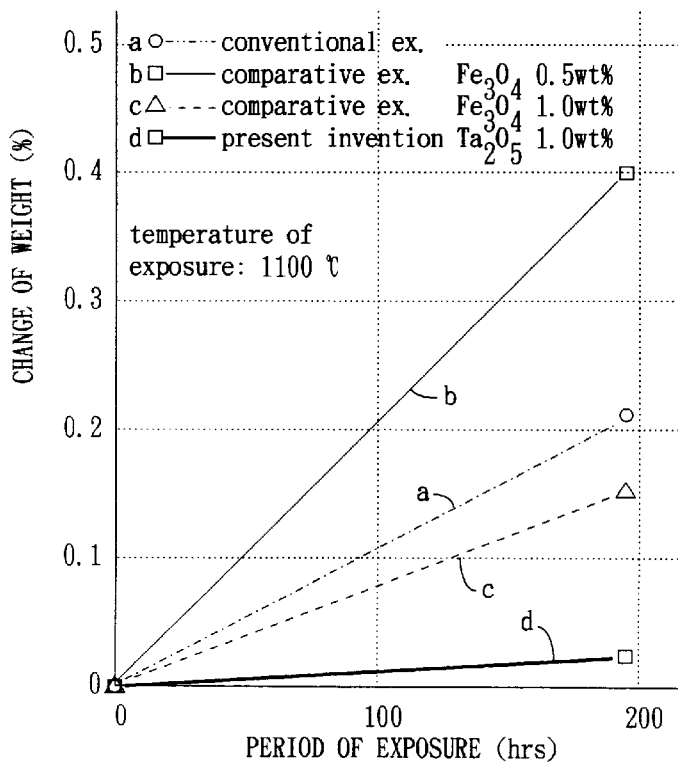
FIG. 4 is a diagram showing a relationship between the exposure time of high temperature air and the increase rate of weight with respect to ceramics according to the present invention and the Comparative Example.

FIGS. 3 and 4 represent the exposure time and the change of weight of five examples of ceramics including the present invention. It is understood that in the ceramics d to which $Ta_2O_5$ is added according to the present invention, the change of weight rarely appears as shown by the line d, whereas in the ceramics to which $Fe_3O_4$ is added according to the Comparative example, the weight apparently increases as shown by the lines b and c.

From the aforementioned test results of exposure of high temperature air, it is considered that in the ceramics to which $Ta_2O_5$ is added according to the present invention, even in the case where the minute layer is formed on the surface of the substrate due to the exposure of high temperature air, the diffusion of oxygen into the substrate is suppressed not to lower the strength of the substrate, but in the ceramics to which $Fe_3O_4$ is added according to the Comparative example, since oxygen passes through the layer and is diffused into the substrate, the substrate itself is oxidized to lower the strength.

Table 1 shows the changes of strength before and after the exposure test of high temperature air with respect to the ceramics in which the first and second adding components are variously changed. The composite oxide as the first adding component is at least one of $3Al_2O_3.2SiO_2$, $2MgO.2Al_2O_3.5SiO_2$, $2MgO.SiO_2$ and $4MgO.5Al_2O_3.2SiO_2$. The adding quantity of the composite oxide and the separate phase thereof is suitably 15 to 60 wt. % in terms of the composite oxide. When the adding quantity of the composite oxide as the first adding component is less than 15 weight parts (about 15 wt. %), the heat conductivity is not small and in addition, the vitreous component is less. Therefore, a protective layer is not formed on the surface of the substrate, a degree of the lowering of strength is small, and the strength is not improved due to the exposure of high temperature air. Further, when the adding quantity of the composite oxide as the first adding component exceeds 60 weight parts (60 wt. %), the strength materially lowers.

The adding quantity of the transition metal elements having 66 to 75 of atomic number as the second adding component is 10 weight parts (10 wt. %) in terms of the oxide thereof, more concretely, 0.5 to 10 wt. %. When the adding quantity of the transition metal oxide as the second adding component exceeds 10 weight parts (10 wt. %), the coefficient of thermal expansion increased so that cracks occurred.

In the ceramics to which oxides of transition metal elements having 66 to 75 of atomic number such as $Ta_2O_5$ as the second adding component, it was confirmed that a layer was formed on the surface of the substrate due to the exposure of high temperature air to thereby improve the strength of the substrate.

TABLE 1

| first component | second comp. (wt %) | | (wt %) | str. (MPa) | str. (MPa) | h.c. (W/mK) | remarks |
|---|---|---|---|---|---|---|---|
| $3Al_2O_3.2SiO_2$ | 0 | $Ta_2O_5$ | 2 | 320 | 295 | 20.2 | *1 |
| $3Al_2O_3.2SiO_2$ | 1 | $Ta_2O_5$ | 2 | 298 | 268 | 19.5 | *1 |
| $3Al_2O_3.2SiO_2$ | 3 | $Ta_2O_5$ | 2 | 296 | 265 | 18.5 | *1 |
| $3Al_2O_3.2SiO_2$ | 3 | $Ta_2O_5$ | 2 | 288 | 265 | 16.2 | *1 |
| $3Al_2O_3.2SiO_2$ | 5 | $Ta_2O_5$ | 2 | 265 | 241 | 13.5 | *1 |
| $3Al_2O_3.2SiO_2$ | 5 | $Ta_2O_5$ | 2 | 255 | 234 | 12.5 | *1 |
| $3Al_2O_3.2SiO_2$ | 15 | $Ta_2O_5$ | 1 | 240 | 256 | 8.6 | |
| $3Al_2O_3.2SiO_2$ | 15 | $Ta_2O_5$ | 10 | 240 | 65 | 8.4 | *2 |
| $3Al_2O_3.2SiO_2$ | 30 | $Ta_2O_5$ | 0.5 | 250 | 265 | 4.5 | |
| $3Al_2O_3.2SiO_2$ | 30 | $Ta_2O_5$ | 1 | 251 | 255 | 4.3 | |
| $3Al_2O_3.2SiO_2$ | 35 | $Ta_2O_5$ | 1.5 | 251 | 263 | 4.2 | |
| $3Al_2O_3.2SiO_2$ | 35 | $Ta_2O_5$ | 1.8 | 249 | 255 | 4.3 | |
| $3Al_2O_3.2SiO_2$ | 40 | $Ta_2O_5$ | 2 | 233 | 245 | 3.6 | |
| $3Al_2O_3.2SiO_2$ | 40 | $Ta_2O_5$ | 2.5 | 238 | 251 | 3.5 | |
| $3Al_2O_3.2SiO_2$ | 50 | $Ta_2O_5$ | 1 | 211 | 230 | 3.2 | |
| $3Al_2O_3.2SiO_2$ | 50 | $Ta_2O_5$ | 1.5 | 199 | 229 | 3.4 | |
| $3Al_2O_3.2SiO_2$ | 50 | $Ta_2O_5$ | 2 | 192 | 215 | 2.5 | |
| $3Al_2O_3.2SiO_2$ | 70 | $Ta_2O_5$ | 10 | 80 | 82 | 2.3 | *2 |
| $2MgO.2Al_2O_3.5SiO_2$ | 30 | $WO_3$ | 1 | 236 | 241 | 4.6 | |
| $2MgO.2Al_2O_3.5SiO_2$ | 30 | $WO_3$ | 1 | 231 | 245 | 4.8 | |
| $2MgO.2Al_2O_3.5SiO_2$ | 30 | $WO_3$ | 2 | 229 | 241 | 4.6 | |
| $2MgO.2Al_2O_3.5SiO_2$ | 30 | $WO_3$ | 2 | 251 | 260 | 4.8 | |
| $2MgO.2Al_2O_3.5SiO_2$ | 30 | $WO_3$ | 10 | 223 | 56 | 5.2 | *2 |
| $2MgO.2Al_2O_3.5SiO_2$ | 30 | $HfO_2$ | 0.5 | 241 | 245 | 3.6 | |
| $2MgO.2Al_2O_3.5SiO_2$ | 30 | $HfO_2$ | 1 | 239 | 241 | 3.5 | |
| $2MgO.2Al_2O_3.5SiO_2$ | 30 | $HfO_2$ | 1.5 | 233 | 243 | 3.5 | |
| $2MgO.2Al_2O_3.5SiO_2$ | 30 | $HfO_2$ | 5 | 229 | 229 | 3.9 | |
| $2MgO.2Al_2O_3.5SiO_2$ | 30 | $HfO_2$ | 10 | 231 | 45 | 4.1 | *2 |
| $2MgO.2Al_2O_3.5SiO_2$ | 50 | $Ta_2O_5$ | 0.5 | 221 | 223 | 4.2 | |
| $2MgO.2Al_2O_3.5SiO_2$ | 50 | $Ta_2O_5$ | 1 | 223 | 240 | 2.6 | |

TABLE 1-continued

| first component | second comp. (wt %) | (wt %) | str. (MPa) | str. (MPa) | h.c. (W/mK) | remarks |
|---|---|---|---|---|---|---|
| $2MgO.2Al_2O_3.5SiO_2$ | 50 $Ta_2O_5$ | 1.5 | 219 | 230 | 2.3 | |
| $2MgO.SiO_2$ | 30 $Ta_2O_5$ | 2 | 281 | 291 | 5.1 | |
| $2MgO.SiO_2$ | 30 $Ta_2O_5$ | 2.5 | 256 | 265 | 4.9 | |
| $2MgO.SiO_2$ | 30 $Ta_2O_5$ | 0.5 | 234 | 241 | 4.9 | |
| $2MgO.SiO_2$ | 30 $Ta_2O_5$ | 1 | 265 | 269 | 4.6 | |
| $2MgO.SiO_2$ | 30 $WO_3$ | 0.5 | 236 | 241 | 4.2 | |
| $2MgO.SiO_2$ | 30 $WO_3$ | 1 | 234 | 245 | 4.3 | |
| $2MgO.SiO_2$ | 30 $WO_3$ | 1.5 | 229 | 223 | 4.2 | |
| $2MgO.SiO_2$ | 30 $HfO_2$ | 0.5 | 231 | 240 | 4.2 | |
| $2MgO.SiO_2$ | 30 $HfO_2$ | 1.5 | 216 | 229 | 3.9 | |
| $2MgO.SiO_2$ | 50 $HfO_2$ | 2 | 251 | 265 | 3.3 | |
| $2MgO.SiO_2$ | 50 $HfO_2$ | 2.5 | 216 | 225 | 3.5 | |
| $2MgO.SiO_2$ | 50 $HfO_2$ | 3 | 209 | 210 | 3.7 | |
| $4MgO.5Al_2O_3.2SiO_2$ | 30 $Ta_2O_5$ | 0.5 | 210 | 221 | 4.5 | |
| $4MgO.5Al_2O_3.2SiO_2$ | 30 $Ta_2O_5$ | 1 | 216 | 230 | 4.6 | |
| $4MgO.5Al_2O_3.2SiO_2$ | 30 $Dy_2O_3$ | 0.5 | 216 | 221 | 4.8 | |
| $4MgO.5Al_2O_3.2SiO_2$ | 30 $Dy_2O_3$ | 1 | 203 | 210 | 5 | |
| $4MgO.5Al_2O_3.2SiO_2$ | 30 $Yb_2O_3$ | 1.5 | 201 | 210 | 4.1 | |
| $4MgO.5Al_2O_3.2SiO_2$ | 30 $Yb_2O_3$ | 2 | 230 | 241 | 3.9 | |
| $4MgO.5Al_2O_3.2SiO_2$ | 30 $Yb_2O_3$ | 2.5 | 210 | 221 | 3.8 | |
| $4MgO.5Al_2O_3.2SiO_2$ | 30 $Yb_2O_3$ | 3 | 251 | 265 | 4.8 | |
| $4MgO.5Al_2O_3.2SiO_2$ | 30 $Yb_2O_3$ | 3.5 | 210 | 220 | 3.6 | |
| $4MgO.5Al_2O_3.2SiO_2$ | 30 $HfO_2$ | 0.5 | 221 | 245 | 3.5 | |
| $4MgO.5Al_2O_3.2SiO_2$ | 30 $WO_3$ | 1 | 213 | 221 | 5.2 | |
| $4MgO.5Al_2O_3.2SiO_2$ | 30 $WO_3$ | 10 | 240 | 45 | 3.9 | *2 |
| $4MgO.5Al_2O_3.2SiO_2$ | 30 $HfO_2$ | 0.5 | 219 | 225 | 4.5 | |
| $4MgO.5Al_2O_3.2SiO_2$ | 50 $HfO_2$ | 1 | 203 | 210 | 4.5 | |
| $4MgO.5Al_2O_3.2SiO_2$ | 50 $HfO_2$ | 3 | 186 | 191 | 4.6 | |
| $4MgO.5Al_2O_3.2SiO_2$ | 50 $HfO_2$ | 10 | 196 | 26 | 4.6 | *2 |

*1: high heat coductivity
*2: cracked

As described above, in the ceramics according to the present invention, since a minute layer is formed on the surface of the substrate due to the exposure of high temperature air, the diffusion of oxygen into the substrate is suppressed to suppress the lowering of strength of the substrate.

According to the present invention, not only the ceramics formed of reacted-sintered silicon nitride but also ceramics whose parent phase is a silicon nitride sintered body used a silicon nitride powder as a starting material can obtain the effects similar to the above.

As describe above, according to the present invention, there is provided ceramics having a low heat conductivity wherein silicon nitride is contained as a main component, a composite oxide or a separate phase thereof and transition metal elements having 66 to 75 of atomic number such as Ta are dispersed into a substrate. Thus, a minute layer grown continuous to the substrate is formed on the surface of the substrate due to the exposure of high temperature air whereby the oxidization of the surface of the substrate and the deterioration of the internal tissue caused by entry of oxygen into the substrate are suppressed due to the presence of the minete layer on the surface of the substrate, as a consequence of which the strength of the substrate is enhanced.

Obviously, many modifications and variations of the present invention are possible in right of the above teachings. It is to be understood, therefore, that the invention can be practiced otherwise than as specifically described.

What is claimed is:

1. A ceramic having a low heat conductivity comprising:
   30 to 84 wt. % of a silicon nitride forming a matrix,
   15 to 60 wt. % of a composite oxide selected from the group consisting of $3Al_2O_3$—$2SiO_2$, $2MgO$—$2Al_2O_3$—$5SiO_2$, $2MgO$—$SiO_2$ and $4MgO$—$5Al_2O_3$—$2SiO_2$, and
   an oxide of a transition metal element present in an amount less than 10 wt. %, the transition metal element having an atomic number in the range of from 66 to 75, the oxide of the transition metal element being dispersed in said matrix.

2. The ceramic having a low heat conductivity according to claim 1, wherein said transition metal element is Ta.

3. The ceramic having a low heat conductivity according to claim 1, wherein said silicon nitride is a reaction-sintered silicon nitride.

4. The ceramics having a low heat conductivity according to claim 1, wherein the oxide of the transition metal element is selected from the group consisting of $Ta_2O_5$, $WO_3$, $HfO_2$, $Dy_2O_3$ and $Yb_2O_3$.

5. The ceramic having a low heat conductivity according to claim 1, wherein the oxide of the transition metal is present in the ceramic in an amount of 0.5 to 10 wt. %.

6. A substrate comprising the ceramic of claim 1 having a vitreous layer with a thickness of about 3 μm formed on the surface of said substrate.

7. A substrate comprising the ceramic of claim 2, having a vitreous layer with a thickness of about 3 μm formed on the surface of said substrate.

* * * * *

UNITED STATES PATENT AND TRADEMARK OFFICE
CERTIFICATE OF CORRECTION

PATENT NO.: 6,025,290
DATED    :  February 15, 2000
INVENTOR(S): Hideki KITA

It is certified that [an/error[s]] appears in the above-identified patent and that said Letters Patent is hereby corrected as shown below:

Title page - Abstract - line 8 - close gaps

Col. 4, line 8, close gaps

Col. 5, in the table (line 12 and 13), delete "$HfO_2$" add --$Ta_2O_5$--

Signed and Sealed this

Third Day of April, 2001

Attest:

NICHOLAS P. GODICI

*Attesting Officer*    *Acting Director of the United States Patent and Trademark Office*